(12) United States Patent
Watanabe et al.

(10) Patent No.: US 6,831,378 B2
(45) Date of Patent: Dec. 14, 2004

(54) SEMICONDUCTOR INTEGRATED CIRCUIT DEVICE AND CONTACTLESS ELECTRONIC DEVICE

(75) Inventors: Kazuki Watanabe, Kokubunji (JP); Ryouzou Yoshino, Hadano (JP); Norihisa Yamamoto, Kodaira (JP); Hajime Kinota, Higashimurayama (JP); Keiji Kamei, Ogo (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 134 days.

(21) Appl. No.: 10/282,142

(22) Filed: Oct. 29, 2002

(65) Prior Publication Data

US 2003/0048653 A1 Mar. 13, 2003

Related U.S. Application Data

(63) Continuation of application No. 09/811,443, filed on Mar. 20, 2001, now Pat. No. 6,487,100.

(30) Foreign Application Priority Data

Mar. 28, 2000 (JP) ........................................ 2000-088800

(51) Int. Cl.[7] .................................................. H02J 9/00
(52) U.S. Cl. ...................................... 307/149; 455/129
(58) Field of Search ........................... 333/23; 363/127, 363/126; 330/57; 455/129; 307/149

(56) References Cited

U.S. PATENT DOCUMENTS

| | | | |
|---|---|---|---|
| 5,038,266 A | 8/1991 | Callen et al. | 363/127 |
| 5,173,849 A | 12/1992 | Brooks | |
| 6,271,712 B1 * | 8/2001 | Ball | 327/531 |
| 6,301,128 B1 | 10/2001 | Jang et al. | 363/127 |
| 6,563,719 B1 * | 5/2003 | Hua et al. | 363/21.06 |

FOREIGN PATENT DOCUMENTS

| | | |
|---|---|---|
| EP | 0 638 872 A1 | 2/1995 |
| JP | 9-265328 | 10/1997 |
| JP | 11 353041 A | 12/1999 |

* cited by examiner

Primary Examiner—Shawn Riley
(74) Attorney, Agent, or Firm—Antonelli, Terry, Stout & Kraus, LLP

(57) ABSTRACT

In a semiconductor integrated circuit device and a contactless electronic device, an AC voltage is applied to first and second input terminals. A rectification transistor having a drain (or collector) connected to a second input terminal and gate (or base) and drain (or collector) connected to each other through a first resistor supplies a rectified current between the first and second input terminals. A first voltage detector means produces a control voltage so that the rectified voltage obtained on the source (or emitter) side of the first rectification transistor is equal to a predetermined reference voltage. The first voltage controlled current source can produce current in accordance with the control voltage and supply the current to the first resistor. Such a power supply circuit is mounted in the contactless electronic device.

15 Claims, 10 Drawing Sheets

US 6,831,378 B2

SEMICONDUCTOR INTEGRATED CIRCUIT DEVICE AND CONTACTLESS ELECTRONIC DEVICE

This is a continuation of application Ser. No. 09/811,443, filed Mar. 20, 2001, now U.S. Pat. No. 6,487,100 the entire disclosure of which is hereby incorporated by reference.

BACKGROUND OF THE INVENTION

The present invention relates to a semiconductor integrated circuit device and a contactless electronic device, and, more particularly, to a technique utilized effectively in a stable power supply circuit of a contactless IC card and semiconductor integrated circuit devices mounted on the contactless IC card.

In recent years, a so-called IC card on which semiconductor integrated circuit devices are mounted has come to be widely used. The IC card attains an exchange of information between a reader/writer and the semiconductor integrated circuit devices and realizes various functions equal to those presently performed by a magnetic card. In a contactless IC card having no external electrode through which a signal and a voltage are supplied to the IC card, an antenna mounted in the IC card receives an electromagnetic wave supplied from the reader/writer, and a voltage generated across the antenna is rectified to produce an internal voltage required for the operation of an inner circuit including semiconductor integrated circuit devices mounted on the IC card. In this case, when excessive electric power is supplied to the inner circuit from the reader/writer so that a power supply voltage higher than the breakdown voltage of the devices constituting the inner circuit is supplied to the inner circuit, the devices are broken. In order to prevent such a breakdown, it is necessary to monitor the power supply voltage level and to control it to prevent a power supply voltage higher than the breakdown voltage from being supplied to the inner circuit.

SUMMARY OF THE INVENTION

The inventors of the present invention have studied a power supply circuit, as shown in FIG. 17, on the basis of the technique disclosed in JP-A-11-353041, published on Dec. 24, 1999. In this circuit, an anode terminal of a diode D01 is connected to an input terminal IN1, and a cathode terminal of the diode D01 is connected to an output terminal OUT1. An anode terminal of a diode D02 is connected to a junction N04 and a cathode terminal thereof is connected to an input terminal IN2. A condenser C01 is connected between the output terminal OUT1 and the junction N04 to constitute a half-wave rectifier circuit.

The following circuit is provided in order to stabilize internal voltages. A source terminal of a P-channel MOSFET (hereinafter referred to as PMOS transistor) MOI is connected to an output terminal OUT2, and a drain terminal thereof is connected to the junction N04. Resistors R01 and R02 constituting a voltage divider are connected in series to each other between the output terminals OUT1 and OUT2. A divided voltage generated at a junction N01 of the resistors R01 and R02 is supplied to an inverting input (−) of the voltage comparator circuit (operational amplifier circuit) A01. A reference voltage VREF is supplied to a non-inverting 5 input (+) of the voltage comparator circuit A01, and a comparison output voltage of the comparator circuit is applied to a gate of the PMOS transistor In the power supply circuit shown in FIG. 17, an input signal applied between the input terminals IN1 and 1N2 is rectified by the half-wave rectifier circuit and is smoothed by the condenser C01. The smoothed voltage is obtained as a voltage difference V12 between the output terminal OUT1 and the junction N04. The smoothed voltage V12 is given by $$V12 = VIN - VF1 - VF2 \quad \text{(equation 1)}$$

where VIN is an amplitude of an input voltage applied between the input terminals IN1 and IN2, VF1 is a forward voltage of the diode D01, and VF2 is a forward voltage of the diode D02.

Thus, when the input voltage VIN is increased, the voltage difference V12 is also increased. Accordingly, when power supply terminals of the inner circuit are connected to the output terminal OUT1 and the junction N04 so that the voltage difference V12 is directly supplied thereto as a power supply voltage, the voltage difference V12 sometimes exceeds the breakdown voltage of the devices constituting the inner circuit to thereby break the devices. In order to prevent a voltage exceeding the breakdown voltage from being applied to the devices constituting the inner circuit, a voltage control circuit is provided including the PMOS transistor MOI and the voltage comparator circuit A01.

In the voltage comparator circuit, when a voltage divided by the resistors R01 and R02, connected between the output terminals OUT1 and OUT2, is higher than the reference voltage VREF (the absolute value of the divided voltage is lower than the absolute value of the reference voltage), the output voltage of the voltage comparator circuit A01 is reduced, so that the voltage produced by the half-wave rectifier circuit, that is, the voltage across the condenser C01, is reduced by a voltage (threshold voltage) between the gate and the source of the PMOS transistor to be outputted. On the contrary, when the divided voltage is lower than the reference voltage VREF (the absolute value of the divided voltage is higher than the absolute value of the reference voltage), the output voltage of the voltage comparator circuit A01 is higher than the voltage at the input terminal IN2, so that the gate voltage of the PMOS transistor MOI is limited to a fixed voltage. Accordingly, the power supply voltage of the inner circuit supplied through the output terminals OUT1 and OUT2 is limited to a fixed voltage in order to make the divided voltage equal to the reference voltage VREF. Thus, the output voltage VOUT obtained from the output terminals OUT1 and OUT2 is stabilized to satisfy the equation (2).

$$VOUT = VREFX(R01+R02)/R01 \quad \text{(equation 2)}$$

In the above circuit operation, by adjusting a resistance ratio of the resistors R01 and R02, the power supply voltage which does not exceed the break-down voltage of the devices in the inner circuit can be supplied to the inner circuit. However, this operation is attained when the following equation (3) is satisfied among the voltage difference V12, the output voltage VOUT, and the voltage Vgs1 between the gate and the source of the PMOS transistor MOI.

$$V12 > VOUT + Vgs1 \quad \text{(equation 3)}$$

When the input voltage VIN, which does not satisfy the equation (3) is inputted, the output voltage is as shown by the following equation (4) and is dependent on the input voltage.

$$VOUT = V12 - Vgs1 \quad \text{(equation 4)}$$

Accordingly, when a sufficiently large input voltage VIN is not supplied, the ratio of the voltage Vgs1 between the gate and the source to the voltage difference V12 is increased, so that a sufficiently large output voltage VOUT cannot be obtained. The MOS transistor M01 is necessarily required to have a higher breakdown voltage since a relatively larger voltage is applied in accordance with the input voltage VIN, and the threshold voltage Vgs1 of the MOS transistor M01 is higher than that of MOSFETs in the inner circuit since a relatively larger current supplied to the inner circuit flows through the MOS transistor M01. For example, the threshold voltage of the MOS transistors in the inner circuit can be reduced to about 0.6 volts by the miniaturization of the devices, while the threshold voltage of the MOS transistor M01 is required to be about 1.5 volts.

As described above, when the voltage loss of the voltage control circuit is increased, a minimum input voltage for normally operating the inner circuit is increased, so that, for example, in the contactless IC card, the deterioration of characteristics thereof such as reduction of communication distance occurs. It is necessary to reduce the voltage loss in the power supply circuit to be as small as possible in order to prevent such a characteristic deterioration. However, in a conventional series regulator in which means for stabilizing the power supply voltage are connected to an output side of the means for rectifying and smoothing a received electromagnetic wave, since a voltage, loss in the means for stabilizing the power supply voltage is large in the state in which electric power supplied to the IC card is small, it is necessary to increase the input voltage VIN for obtaining the lower limit operation voltage required for operation of the inner circuit, so that the communication distance is not extended.

It is an object of the present invention to provide a semiconductor integrated circuit device and a contactless electronic device having the power supply circuit realizing the production of a smoothed voltage stabilized with high efficiency and stable operation of the inner circuit. It is another object of the present invention to provide a contactless electronic device capable of lengthening communication distance. The above and other objects and novel features of the present invention will be apparent from the following description of the invention and the accompanying drawings.

According to a first aspect of the present invention, an AC voltage is applied to first and second input terminals, and a rectified current is supplied between the first and second input terminals by means of a rectifying transistor having a drain (or collector) connected to the second input terminal and a gate (or base) and a drain (or collector) connected through resistor means. A control voltage is produced by first voltage detection means so that a rectified voltage produced on the side of the source (or emitter) of the first rectifying transistor is equal to a predetermined reference voltage. A first voltage controlled current source produces a current in accordance with the control voltage and supplies the current to the first resistor means.

According to another aspect of the present invention, in a contactless electronic device including a power supply circuit for producing an internal voltage from electric power received by an antenna for receiving signals and electric power, in an inner circuit which operates by the internal voltage, and in a communication circuit which operates by the internal voltage and receives and transmits signals through the antenna, the power supply circuit supplies an AC voltage produced by the antenna to first and second input terminals, and it supplies a rectified current between the first and second input terminals by means of a rectifying transistor having a drain (or collector) connected to the second input terminal and a gate (or base) and a drain (or collector) connected through resistor means. A control voltage is produced by first voltage detection means so that a rectified voltage produced on the side of the source (or emitter) of the first rectifying transistor is equal to a predetermined reference voltage. A first voltage controlled current source produces a current in accordance with the control voltage and supplies the current to the first resistor means.

DESCRIPTION OF THE EMBODIMENTS

Figure 1:
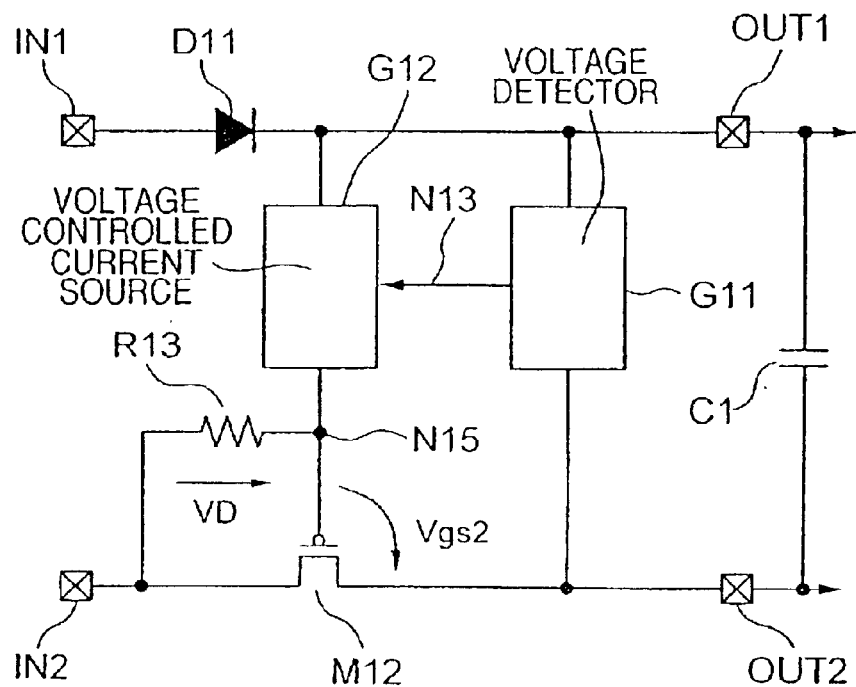
FIG. 1 is a circuit diagram illustrating a basic circuit configuration of a power supply circuit mounted in a semiconductor integrated circuit device. According to an embodiment of the present invention.

FIG. 1 is a circuit diagram illustrating the basic circuit configuration of an embodiment of a power supply circuit mounted in a semiconductor circuit device according to the present invention. The circuit elements and circuit blocks shown in FIG. 1 are fabricated on a single semiconductor substrate of mono-crystal silicon or the like by means of a known fabrication technique of semiconductor integrated circuit devices.

In FIG. 1, an anode terminal of a diode D11 is connected to an input terminal IN1, and a cathode terminal thereof is connected to an output terminal OUT1. A source terminal of a PMOS transistor M12 is connected to an output terminal OUT2, and a drain terminal thereof is connected to an input terminal IN2. A gate terminal of the PMOS transistor M12 is connected to a junction N15, and a resistor R13 is connected between the junction N15 and the input terminal 1N2 to thereby constitute a half-wave rectifier circuit.

A smoothing condenser Cl is connected between the output terminals OUT1 and OUT2, and a voltage detection circuit G11 for detecting a smoothed output voltage VOUT between the output terminals OUT1 and OUT2 to produce a detection voltage in accordance with a change of the output voltage VOUT is connected between the output terminals OUT1 and OUT2. An output terminal of the voltage detection circuit G11 is connected to a junction N13. The junction N13 is connected to a control input terminal of a voltage controlled current source G12. Accordingly, the voltage controlled current source G12 is operated to change a current in accordance with the detection voltage produced by the voltage detection circuit G11. The voltage controlled current source G12 is connected between the output terminal OUT1 and the junction N15.

The voltage detection circuit G11 which is connected between the output terminals OUT1 and OUT2 detects a voltage difference between the output terminals OUT1 and OUT2, that is, it detects that the output voltage VOUT is higher than a desired voltage in the absolute value thereof. The voltage detection circuit G11 supplies a voltage detection signal thereof through the junction N13 to the voltage controlled current source G12. The voltage controlled current source G12 produces a current in accordance with the voltage detection signal and supplies the current from the output terminal OUT1 through the junction N13 to the resistor R13.

A potential difference or voltage difference VD between the junction N15 and the input terminal IN2 is produced across the resistor R13 by the current supplied from the voltage controlled current source G12. Consequently, the voltage at the output terminal OUT2 is higher than that at the input terminal IN2 by a sum of the voltage Vgs2 between the gate and the source of the PMOS transistor M12 and the voltage VD (=VD+Vgs2). In other words, the voltage at the output terminal OUT2 is controlled so as to be a voltage smaller in absolute value than the voltage at the junction N15, that is, the gate voltage at the PMOS transistor M12, by the voltage (threshold voltage) Vgs2 between the gate and the source of the PMOS transistor M12 on condition that the potential at the output terminal OUT1 is set to a reference potential.

The voltage VD is controlled in accordance with the output voltage of the voltage detection circuit G11, and, accordingly, when an excessive input voltage is applied between the input terminals IN1 and 1N2, the voltage VD is increased so that a negative feedback is effected to reduce the output voltage VOUT. When the input voltage is reduced, the current flowing through the resistor R13 becomes smaller so that the voltage VD is also reduced and the negative feedback is effected to increase the output voltage VOUT.

In the embodiment, when the input voltage applied between the input terminals IN1 and IN2 is so small that the desired output voltage OUT cannot be produced, the voltage detection circuit G11 produces a control voltage by which the voltage controlled current source G12 cannot produce a current. Accordingly, no current flows through the resistor R13. In this state, the gate (junction N15) and the drain (input terminal IN2) of the PMOS transistor M12 are set to the same potential through the resistor R13, and, accordingly the potential difference between the output terminal OUT2 and the input terminal IN2 or the voltage difference between the output terminal OUT2 and the input terminal IN2 is only the voltage Vgs2 between the gate and the source. Accordingly, a voltage loss can be reduced by a forward voltage drop of the rectifying diode D02 as compared with the power supply circuit of FIG. 17, described above.

As viewed from another angle, in this embodiment, the single PMOS transistor M12 has the rectification function and the voltage regulating or stabilizing function. In other words, by constituting a diode of a rectifier circuit by the PMOS transistor M12, the number of circuit elements can be reduced, and by controlling the voltage between the gate and the drain of the PMOS transistor M12 in accordance with the output voltage VOUT, when excessive input electric power is supplied, a limitation is effected so that excessive voltage is not applied to the inner circuit, and when small input electric power is supplied, a voltage loss in the elements to be controlled can be suppressed.

Figure 2:
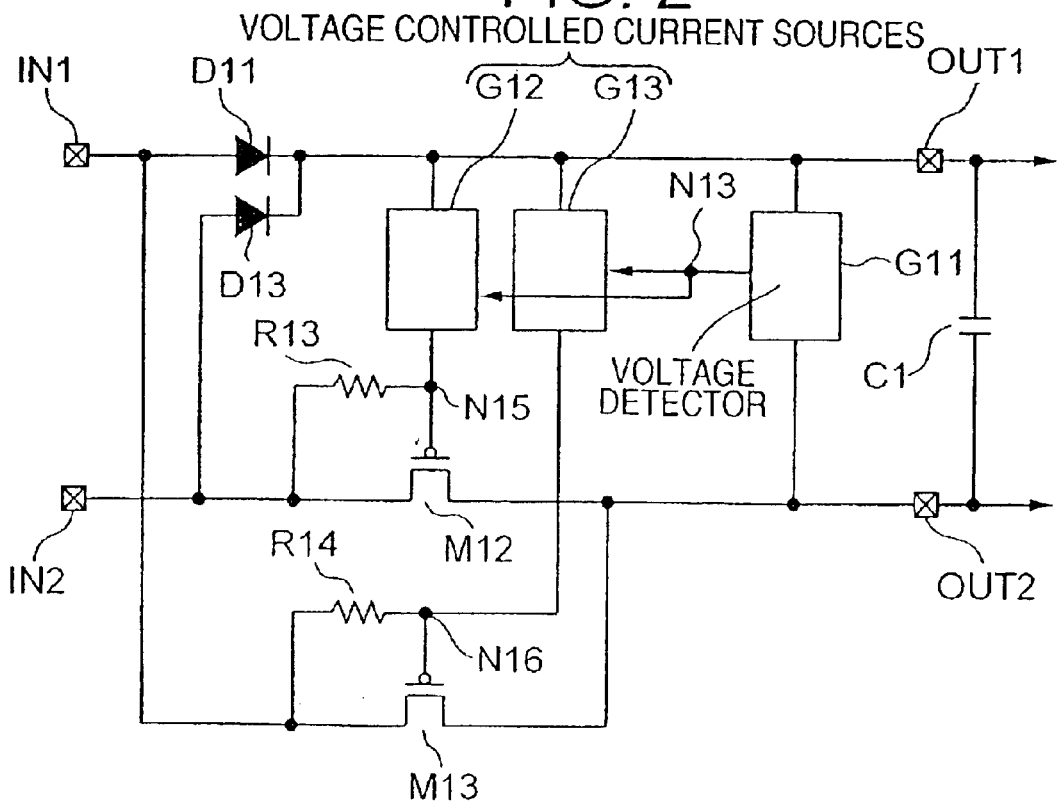
FIG. 2 is a circuit diagram illustrating a basic circuit configuration of a power supply circuit mounted in a semiconductor integrated circuit device according to another embodiment of the present invention.

FIG. 2 is a circuit diagram illustrating the basic circuit configuration of another embodiment of a power supply circuit mounted in a semiconductor integrated circuit device according to the present invention. This embodiment has the rectification function constituted by a full-wave rectifier. In the embodiment, the following circuits are added to the embodiment of FIG. 1 so that the full-wave rectification is realized.

The diode D11, the voltage controlled current source G12, the voltage detection circuit G11, the PMOS transistor M12, and the resistor R13 are the same as those in the embodiment of FIG. 1. On the contrary, a diode D13, a voltage controlled current source G13, a PMOS transistor M13 and a resistor R14 are added so as to perform a rectifying operation even when an AC signal applied between the input terminals IN1 and IN2 has a negative polarity, that is, when a potential at the input terminal IN2 is higher than that at the input terminal IN1.

An anode terminal of the added diode D13 is connected to the input terminal IN2, and a cathode terminal of the diode D13 is connected to the output terminal OUT1. A source terminal of the PMOS transistor M13 is connected to the output terminal OUT2, and a drain terminal thereof is connected to the input terminal IN1. A gate terminal of the PMOS transistor M13 is connected to a junction N16 and the resistor R14 is connected between the junction N16, and the input terminal IN1. The voltage controlled current source G13 is connected between the output terminal OUT1 and the junction N16. The output terminal of the voltage detection circuit G11 is connected to the input terminals (junction N13) of the voltage controlled current sources G12 and G13 in common so that the voltage controlled current sources G12 and G13 are controlled by the voltage detection signal.

In the embodiment shown in FIG. 2, when the potential at the input terminal IN1 is lower than that at the input terminal 1N2, the potential at the junction N15 can be controlled to thereby control the potential at the output terminal OUT2 to the output terminal OUT1, and when the potential at the input terminal IN1 is higher than that at the input terminal IN2, the potential at the junction N16 can be controlled to thereby control the potential at the output terminal OUT2 to the output terminal OUT1, so that the rectification function in the embodiment of FIG. 1 can be improved to the full-wave rectification function and a more stable output voltage VOUT can be produced as compared with the embodiment shown in FIG. 1.

Figure 3:
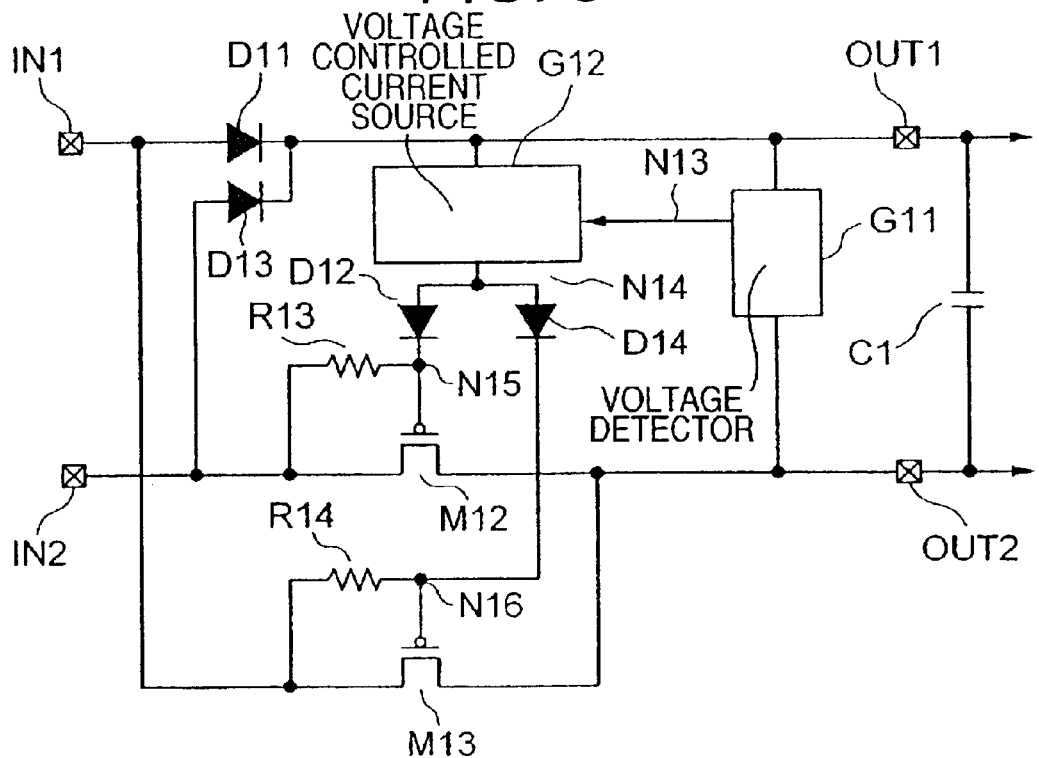
FIG. 3 is a circuit diagram illustrating a basic circuit configuration of a power supply circuit mounted in a semiconductor integrated circuit device according to a further embodiment of the present invention.

FIG. 3 is a circuit diagram illustrating a basic circuit configuration of another embodiment of a power supply mounted in a semiconductor integrated circuit device according to the present invention. In this embodiment, the voltage controlled current sources G12 and G13 of the embodiment of FIG. 2 are simplified to a common one for purposes of simplification of the circuit. That is, the voltage controlled current source G13 is eliminated and the voltage controlled current source G12 is connected to the junctions N15 and N16 corresponding to the respective gates of the PMOS transistors M12 and M13 through diodes D12 and D14, respectively.

In the embodiment of FIG. 3, with the action of the diodes D12 and D14, when the potential at the input terminal IN1 is higher than that at the input terminal IN2, the current produced by the voltage controlled current source G12 flows into the resistor R13, and when the potential at the input terminal IN1 is lower than that at the input terminal IN2, the current produced by the voltage controlled current source G12 flows into the resistor R14. Accordingly, the embodiment shown in FIG. 3 can realize the same function as the embodiment shown in FIG. 2, and can also reduce an area used by the transistors.

Figure 4:
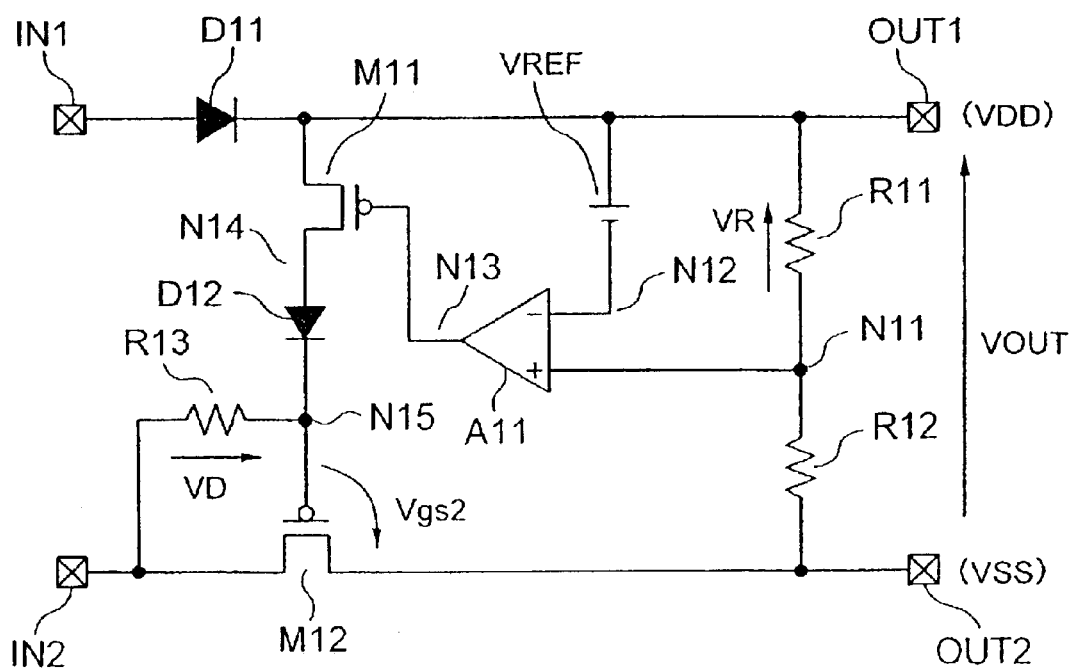
FIG. 4 is a circuit diagram illustrating a power supply circuit mounted in a semiconductor integrated circuit device according to another embodiment of the present invention.

FIG. 4 is a circuit diagram schematically illustrating an embodiment of a power supply circuit mounted in a semiconductor integrated circuit device according to the present invention. In this embodiment, a definite circuit corresponding to the embodiment of FIG. 1 is shown. That is, an actual circuit configuration for realizing the voltage detector G11 and the voltage controlled current source G12 of FIG. 1 is shown. The diode D11, the PMOS transistor M12 and the resistor R13 are the same as those of FIG. 1, and, accordingly, a description thereof is omitted. Further, in the embodiments shown in FIGS. 4 to 9 described below, the smoothing condenser C1 is omitted.

The voltage detection circuit G11 of FIG. 1 is configured as follows. Voltage dividing resistors R11 and R12 are connected between the output terminals OUT1 and OUT2. A divided voltage produced at the junction N11 of the resistors R11 and R12 is supplied to a non-inverting input (+) of an operational amplifier circuit A11. A reference voltage source VREF is connected between an inverting input (−) of the operational amplifier circuit A11 and the output terminal OUT1.

The voltage controlled current source G12 of FIG. 1 is configured as follows. A PMOS transistor M11 and a diode D12 connected in series are connected between the output terminal OUT1 and the junction N15 which is connected to the gate of the PMOS transistor M12. An anode of the diode D12 is connected to the PMOS transistor M11, and a cathode thereof is connected to the junction N15 so that a current flows from the output terminal OUT1 to the input terminal IN2. The diode D12 acts to prevent an undesirable current from flowing from the input terminal IN2 to the output terminal OUT1. The operational amplifier circuit A11 compares a divided voltage VR at the junction N11 with a reference voltage of the reference voltage source VREF to produce an output voltage in accordance with a voltage difference therebetween and to supply the output voltage to the gate of the PMOS transistor M11.

In this embodiment, the output voltage VOUT corresponding to a potential difference between the output terminals OUT1 and OUT2 is divided by the resistors R11 and R12 connected between the output terminals OUT1 and OUT2 so that the potential difference VR between the output terminal OUT1 and the junction N11 is produced across the resistor R11. The potential difference VR produced by such a voltage division is compared with the reference voltage VREF between the output terminal OUT1 and the output terminal OUT2 by the operational amplifier circuit A11, and when the voltage VR is higher than the reference voltage VREF in the absolute value, that is, when the potential at the non-inverting input (+) of the operational amplifier circuit A11 is lower than that at the inverting input (−) thereof, the output voltage of the operational amplifier circuit A11 is lower than the potential at the source of the PMOS transistor M11 by the threshold voltage or more, so that the PMOS transistor M11 produces a current corresponding to the output voltage.

The PMOS transistor M11 acts as a voltage controlled current source to produce the current corresponding to the output voltage of the operational amplifier circuit A11 and it supplies the current to the resistor R13. A voltage drop is produced across the resistor R13 by the current, and the potential at the junction N15 is made higher than that at the input terminal IN2 by the voltage drop VD. Accordingly, the voltage at the output terminal OUT2 is limited to a voltage that is higher than the voltage at the junction N15 by the voltage (threshold voltage) Vgs2 between the gate and the source of the PMOS transistor M12.

The voltage VD produced across the resistor R13 is increased in accordance with the input voltage (voltage difference between IN1 and IN2), that is, the operational amplifier circuit A11 produces the voltage which satisfies the equation (2) and the PMOS transistor M11 produces the current that is supplied to the resistor R13. Accordingly, even when an excessive input voltage is applied between the input terminals IN1 and IN2, the voltage VD produced across the resistor R13 is increased in accordance with the input voltage and the output voltage OUT can be stabilized to satisfy the equation (2).

When the difference between the voltage VR and the reference voltage VREF becomes smaller in absolute value, that is, when the potential difference between the inverting input (−) and the non-inverting input (+) of the operational amplifier circuit A11 is reduced, the output voltage of the operational amplifier circuit A11 is reduced to the negative side, so that the current flowing through the PMOS transistor M11 is reduced. Consequently, the PMOS transistor M11 is controlled to reduce the current flowing through the resistor R13 and the voltage VD, and this, in turn, acts to satisfy the equation (2).

When the potential difference between the voltage VR and the reference voltage VREF is reversed, that is, when the potential at the non-inverting input (+) of the operational amplifier circuit A11 is higher than that at the inverting input (−) thereof, the operational amplifier circuit A11 produces the output voltage corresponding to the voltage at the output terminal OUT1. At this time, the potential at the gate terminal of the PMOS transistor M11 is substantially the same as the potential at the source terminal thereof, so that the PMOS transistor M11 is turned off to thereby cut off the current flowing through the resistor R13. In this manner, when the input voltage is smaller than the output voltage VOUT set by the reference voltage VREF, no current flows through the resistor R13 and accordingly the potentials at the gate and the drain terminals of the PMOS transistor M12 are the same, so that the PMOS transistor M12 acts as a diode to perform the rectification operation.

Accordingly, in the power supply circuit of the embodiment, when excessive electric power is supplied, it is controlled to prevent the excessive voltage from being applied to the inner circuit, and when the input electric power is small, the voltage loss by the elements to be controlled can be suppressed to 0 volts. Thus, the circuit of the embodiment shown in FIG. 4 can attain the same function as the embodiment of FIG. 1.

Figure 5:
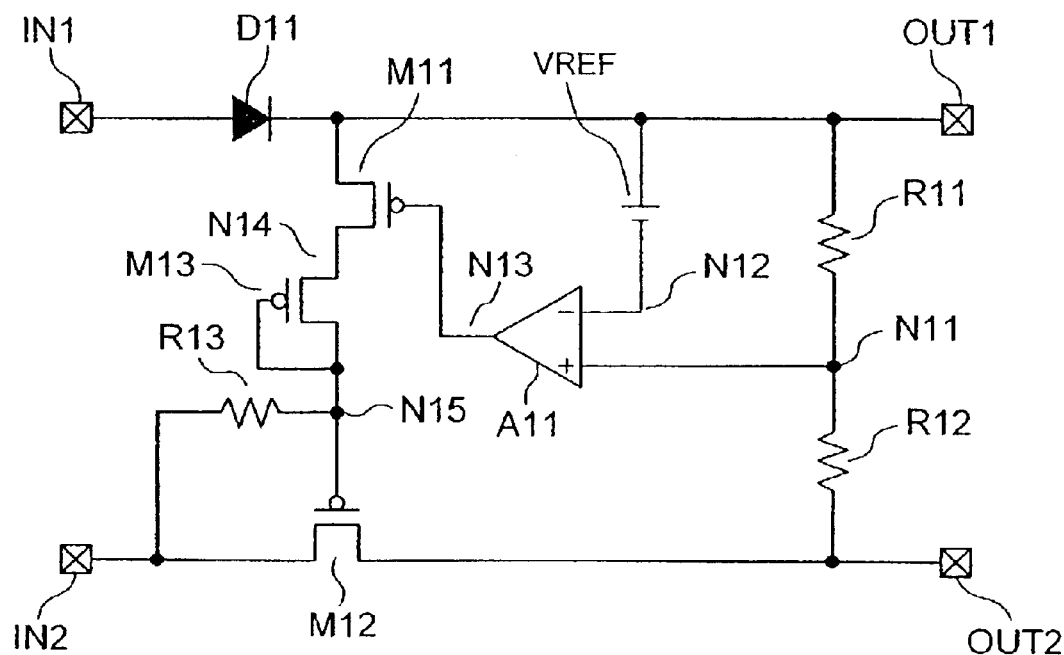
FIG. 5 is a circuit diagram illustrating a power supply circuit mounted in a semiconductor integrated circuit device according to another embodiment of the present invention.

FIG. 5 is a circuit diagram schematically illustrating another embodiment of a power supply circuit mounted in a semiconductor integrated circuit according to the present invention. In this embodiment, a modified example of the embodiment of FIG. 3 is shown. In this embodiment, the diode D11, the PMOS transistor M12, the resistor R13, the operational amplifier circuit A11, the voltage dividing resistors R11 and R12, and the reference voltage source VREF are the same as those of the embodiment shown in FIG. 4, and a description thereof, accordingly, is omitted.

In the embodiment of FIG. 5, the diode D12 of the embodiment shown in FIG. 4 is replaced by a PMOS transistor M13. That is, the drain and gate terminals of the PMOS transistor M13 are connected to the junction N15, and the source terminal thereof is connected to the PMOS transistor N11. Consequently, the current flowing through the resistor R13 can flow in one direction from the junction N15 to the input terminal IN2, and the PMOS transistor M13 can realize the same function as the diode D12 of FIG. 4. In this manner, when the diode D12 is replaced by the PMOS transistor, the PMOS transistor can be utilized as it is, and, accordingly, particular separation between elements cannot be required as in the case where PN junction diodes are used.

Figure 6:
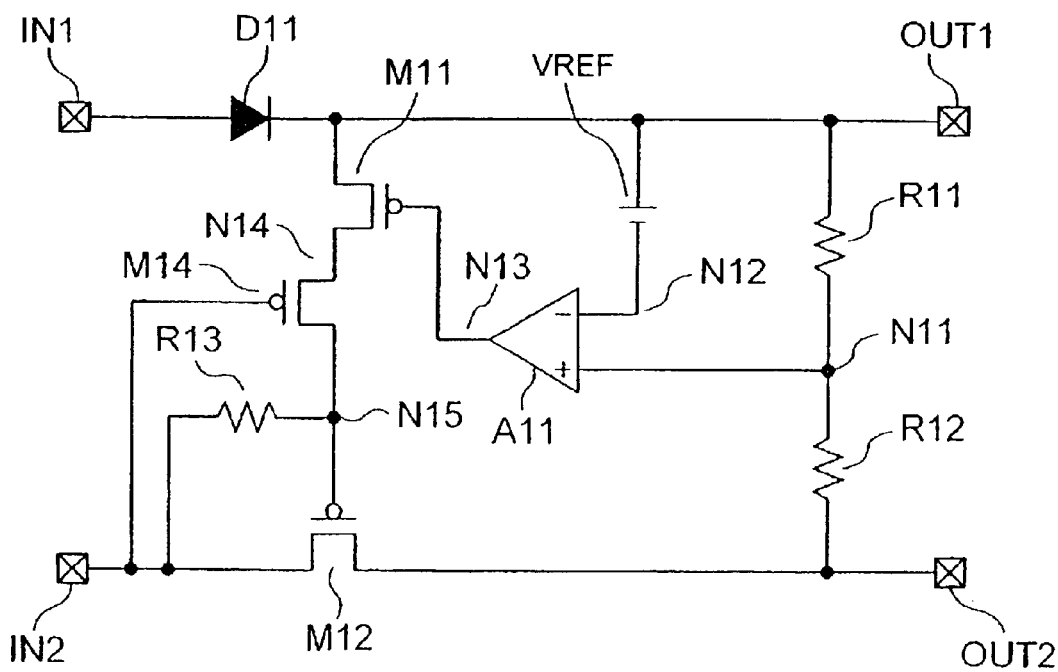
FIG. 6 is a circuit diagram illustrating a power supply circuit mounted in a semiconductor integrated circuit device according to another embodiment of the present invention.

FIG. 6 is a circuit diagram schematically illustrating another embodiment of a power supply mounted in a semiconductor integrated circuit device according to the present invention. In this embodiment, a modification of the embodiment of FIG. 5 is shown. The circuit elements of this embodiment are the same as those shown in FIG. 5. The circuit in FIG. 6 is different from the circuit in FIG. 5 in that a PMOS transistor M14 is not diode-connected as shown in FIG. 5, and the gate terminal thereof is changed to be connected to the input terminal IN2. Even in this circuit configuration, the current flowing through the resistor R13 can flow in one direction from the junction N15 to the input terminal IN2, and the same function as that of the diode D12 or the diode-connected PMOS transistor M13 in FIG. 4 or 5 can be attained.

The PMOS transistor M14 of this embodiment performs a switching operation so that when the voltage at the input terminal IN2 connected to the gate of the PMOS transistor M14 is lower than the voltage applied to the source thereof by the threshold voltage, the PMOS transistor M14 is turned on. Generally speaking, this operation means that there is a possibility that the PMOS transistor M14 is turned on during a half-wave period in which the voltage at the input terminal IN1 has a positive polarity to the voltage at the input terminal IN2. On the contrary, the PMOS transistor M14 is turned off during the half-wave period in which the voltage at the input terminal IN1 has a negative polarity to the voltage at the input terminal IN2. In the embodiment of FIG. 5, the PMOS transistor M13 produces a voltage loss corresponding to the threshold voltage between the gate and source terminals thereof, whereas in the embodiment of FIG. 6, the voltage between the source and drain terminals of the PMOS transistor becomes a voltage loss, and the degree of freedom for setting the potential at the junction N15 is increased. The PMOS transistors M13 and M14 shown in FIGS. 5 and 6 can act in the same manner as above even when the rectification function is changed to the full-wave rectification.

Figure 7:
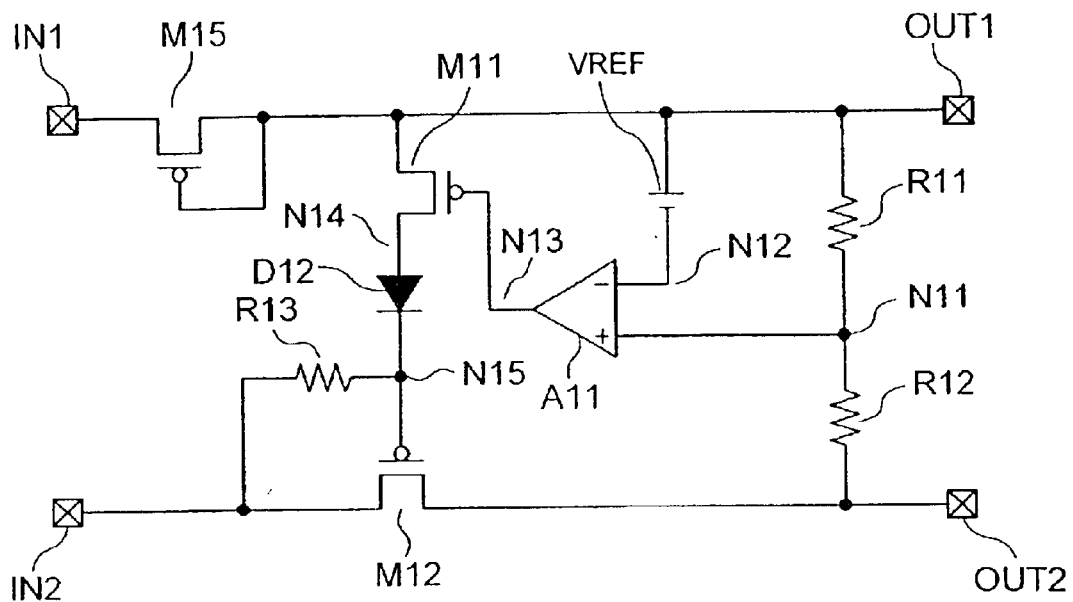
FIG. 7 is a circuit diagram illustrating a power supply circuit mounted in a semiconductor integrated circuit device according to another embodiment of the present invention.

FIG. 7 is a circuit diagram schematically illustrating another embodiment of a power supply circuit mounted in a semiconductor integrated circuit device according to the present invention. In this embodiment, a modification of the embodiment of FIG. 4 is shown. In this embodiment, the diode D11 of FIG. 4 is realized by a PMOS transistor M15. That is, in this embodiment, the PMOS transistor M15 having a drain terminal and a gate terminal connected to the output terminal OUT1 to form a diode is substituted for the diode D11 of FIG. 4. Thus, the current flowing through the PMOS transistor M15 can flow in one direction from the input terminal IN1 to the output terminal OUT1 to realize the same function as the diode D11 shown in FIG. 4. In this manner, when the diode D11 is replaced by the PMOS transistor M15, the PMOS transistor can be utilized as it is, and, accordingly, particular separation between elements cannot be required as in the case where PN junction diodes are used.

Figure 8:
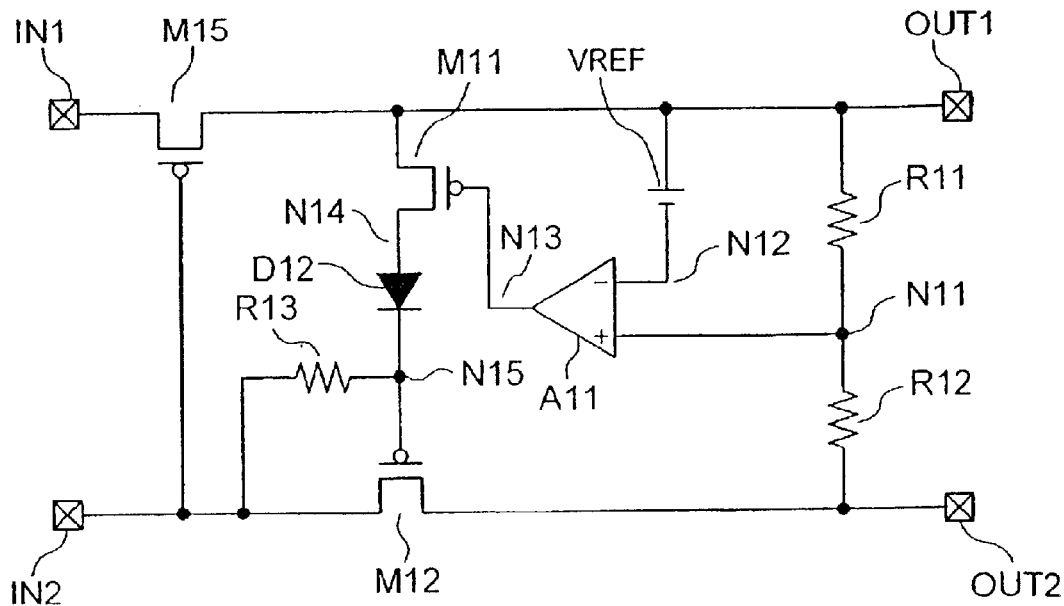
FIG. 8 is a circuit diagram illustrating a power supply circuit mounted in a semiconductor integrated circuit device according to another embodiment of the present invention.

FIG. 8 is a circuit diagram schematically illustrating another embodiment of a power supply circuit mounted in a semiconductor integrated circuit device according to the present invention. In this embodiment, a modification of the embodiment of FIG. 7 is shown. In this embodiment, the gate terminal of the PMOS transistor M15 is connected to the input terminal IN2 instead of the diode connection of the PMOS transistor M15 shown in FIG. 7. The operation of the PMOS transistor M15 in this embodiment is the same as that of the PMOS transistor M14 of FIG. 6. That is, the PMOS transistor M15 performs a switching operation so that when the voltage at the input terminal IN2 connected to the gate terminal is lower than the voltage at the input terminal IN1 connected to the source terminal by the threshold voltage, the PMOS transistor M15 is turned on.

The PMOS transistor M15 performs a switching operation so that the PMOS transistor M15 is turned on during a half-wave period in which the voltage at the input terminal IN1 has a positive polarity to the voltage at the input terminal IN2, and, on the contrary, the PMOS transistor M15 is turned off during the half-wave period in which the voltage at the input terminal IN1 has a negative polarity to the voltage at the input terminal IN2. This is basically the same as in the case where the diode D11 is used. However, as compared with the embodiment of FIG. 7 in which the PMOS transistor M15 includes the gate and the drain terminals connected to each other to form the diode, a voltage loss is produced by the threshold voltage between the gate and source terminals in the embodiment of FIG. 7, whereas the voltage between the source and the drain terminals of the PMOS transistor M15 becomes a voltage loss in the embodiment of FIG. 8, so that a higher voltage can be produced.

Such an operation is useful for preventing the semiconductor integrated circuit device from being latched up undesirably. That is, the source terminal of the PMOS transistor connected to the input terminal IN1 is formed of a P-type area formed on an N-type semiconductor substrate, for example. The highest power supply voltage VDD on the positive polarity side obtained from the output terminal OUT1 is applied to the N-type semiconductor substrate, and, accordingly, when the PMOS transistor M15 is connected to form the diode, the voltage loss corresponding to the threshold voltage thereof is applied as a forward voltage between the P-type area connected to the input terminal IN1 and the N-type semiconductor substrate connected to the output terminal OUT1, so that the margin for the latching-up operation is reduced. On the contrary, when the voltage loss such as the voltage between the source and drain terminals of the PMOS transistor M15 is reduced as in this embodiment, the margin for the latching-up operation can be increased correspondingly.

Figure 9:
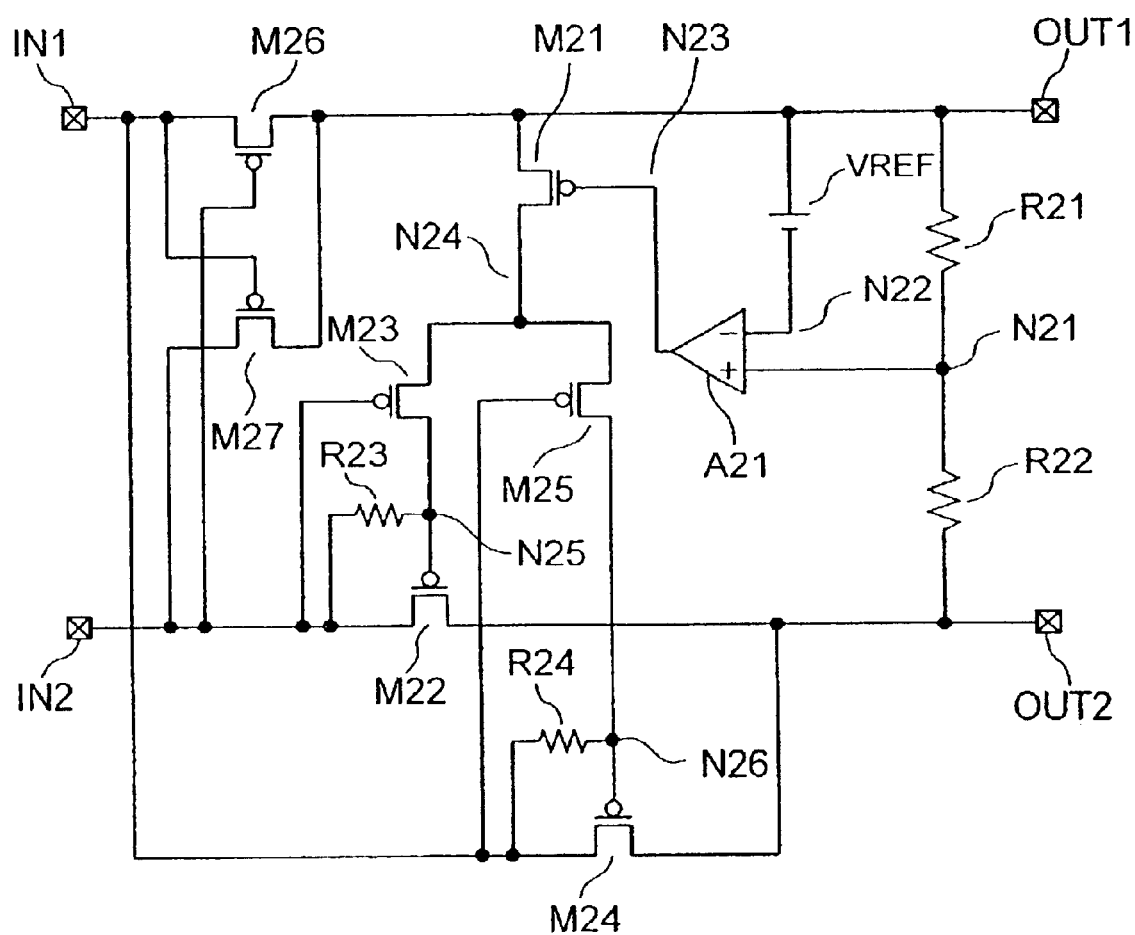
FIG. 9 is a circuit diagram illustrating a power supply circuit mounted in a semiconductor integrated circuit device according to another embodiment of the present invention.

FIG. 9 is a circuit diagram schematically illustrating another embodiment of a power supply circuit mounted in a semiconductor integrated circuit device according to the present invention. This embodiment is a modified example of the embodiments of FIGS. 6 and 8 to which full-wave rectification is applied. The PMOS transistor M15 of FIG. 8 corresponds to a PMOS transistor M26, and a PMOS transistor M27 for full-wave rectification includes source and drain terminals connected between the input terminal IN2 and the output terminal OUT1, and a gate terminal connected to the input terminal IN1. Further, the diode provided in the voltage controlled current source is constituted by PMOS transistors M23 and M25, and their respective gate terminals are connected to the input terminal IN2. In this manner, the PMOS transistors for performing the switching operation are substituted for the diode to attain the full-wave rectification operation, so that the output voltage VOUT can be produced stably with high efficiency.

Figure 10:
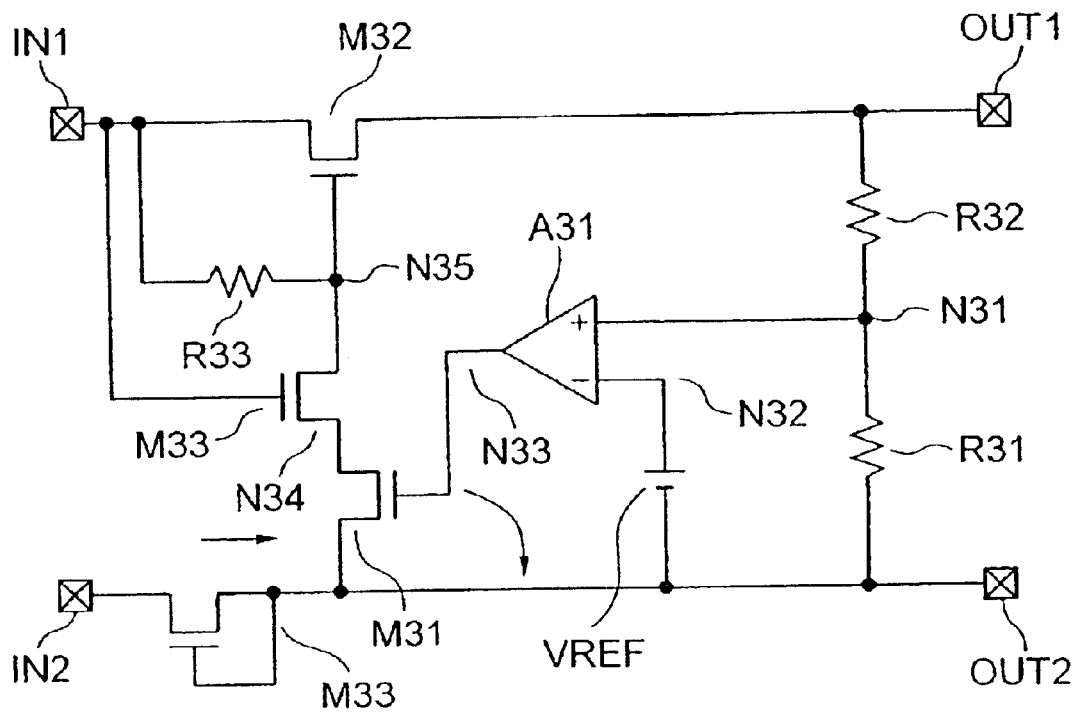
FIG. 10 is a circuit diagram illustrating a power supply circuit mounted in a semiconductor integrated circuit device according to another embodiment of the present invention.

FIG. 10 is a circuit diagram schematically illustrating another embodiment of a power supply circuit mounted in a semiconductor integrated circuit device according to the present invention. In this embodiment, the conductivity type of the MOS transistors is changed so that N-channel type MOSFETs are substituted for the P-channel type MOSFETs. The function of the circuit in FIG. 10 is the same as that of FIG. 7. Since the conductivity type of the MOS transistors used is changed to the N-channel type and the polarity of the operation voltage is reversed, an NMOS transistor M32 attaining the stabilization operation and the rectification operation is connected to the input terminal IN1, and a diode-connected NMOS transistor M33 is connected to the input terminal IN2. Further, an operational amplifier circuit A31 is applied with the voltage of the reference voltage source VREF connected to the output terminal OUT2 as a reference potential. The PMOS transistors even in FIGS. 3 to 6, 8 and 9 can be replaced by NMOS transistors by means of the same method as in the embodiment of FIG. 10.

Figure 11:
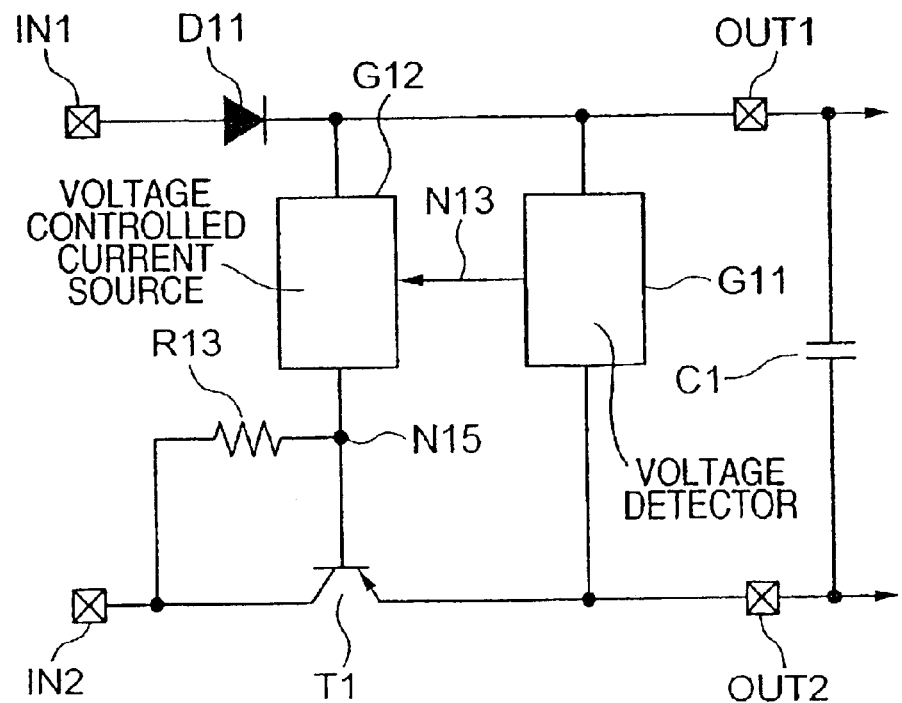
FIG. 11 is a circuit diagram illustrating a basic circuit configuration of a power supply circuit mounted in a semiconductor integrated circuit device according to another embodiment of the present invention.

FIG. 11 is a circuit diagram schematically illustrating the basic circuit configuration of still another embodiment of a power supply circuit mounted in a semiconductor integrated circuit device according to the present invention. In this embodiment, the MOS transistors are replaced by bipolar transistors. That is, in the basic configuration as shown in FIG. 1, the PMOS transistor M12 attaining the rectification operation and the stabilization operation of the output voltage is replaced by a PNP-type bipolar transistor Ti. That is, a collector of the transistor Ti is connected to the input terminal IN2, and the resistor R13 is connected between a base and a collector of the transistor Ti. An emitter of the transistor Ti is connected to the output terminal OUT2. The base of the transistor Ti is supplied with a current produced by the voltage controlled current source G12.

Figure 12:
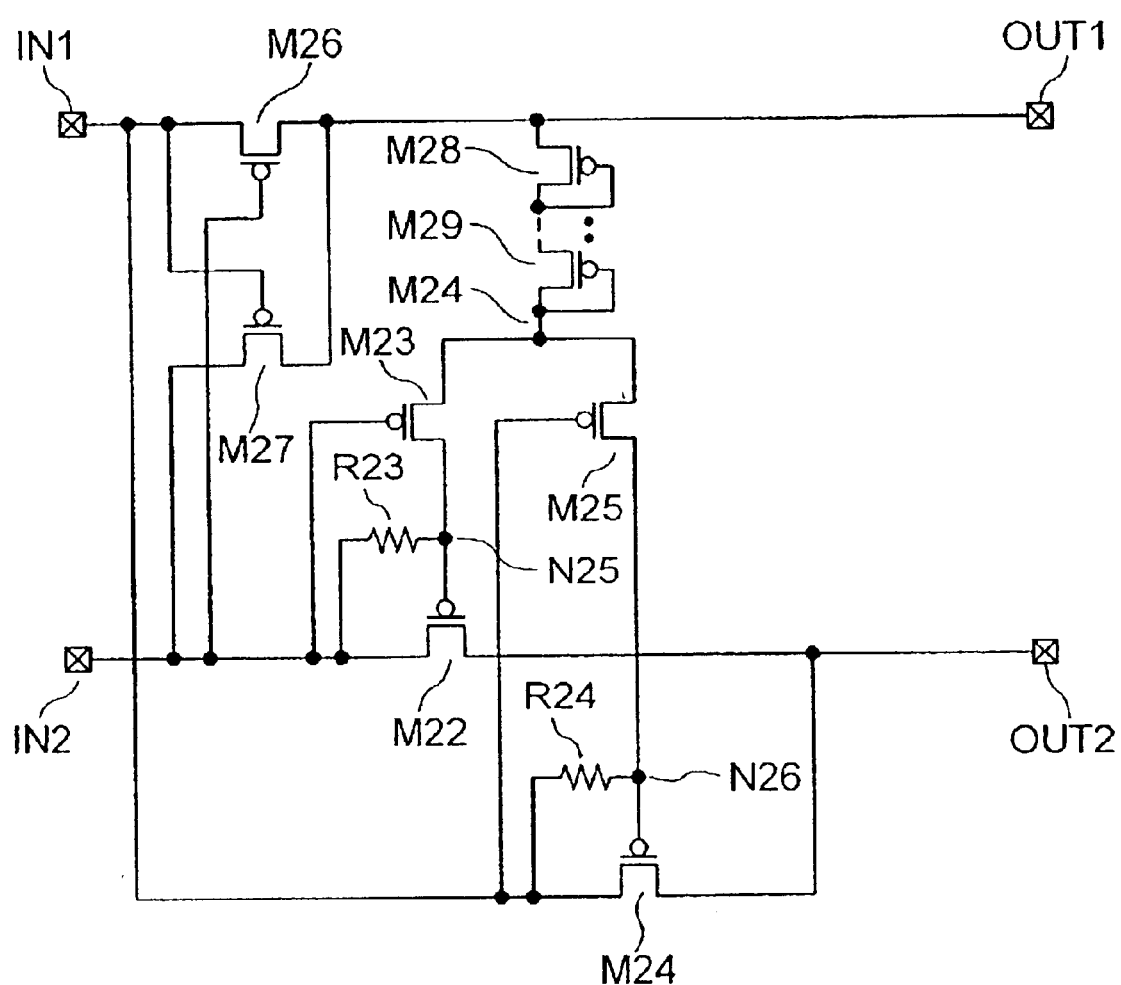
FIG. 12 is a circuit diagram illustrating a power supply circuit mounted in a semiconductor integrated circuit device according to another embodiment of the present invention.

FIG. 12 is a circuit diagram schematically illustrating still another embodiment of a power supply circuit mounted in a semiconductor integrated circuit device according to the present invention. In this embodiment, the voltage controlled current source G11 and the voltage detection circuit G12 are constituted by the same circuit. That is, a constant-voltage characteristic having a threshold voltage between the gate and the source of the diode-connected MOS transistor is utilized to detect a voltage and supply a control current corresponding to the voltage to the resistor for the voltage stabilization operation. This embodiment is shown as a modification example of the embodiment of FIG. 9.

In this embodiment, the MOS transistor M21, the operational amplifier circuit A21, the reference voltage source VREF, and the voltage dividing resistors R21 and R22 in FIG. 9 are replaced by diode-connected PMOS transistors M28 and M29. For example, when the output voltage is stabilized to about 2 volts, three diode-connected PMOS transistors may be connected in series for the threshold voltage thereof of 0.7 volts. As compared with the case using the reference voltage source VREF and the operational amplifier circuit A21, the voltage stabilization characteristic is slightly inferior since the threshold voltage of the series-connected PMOS transistors is increased in accordance with a flowing current, while the breakdown of the devices in the inner circuit is prevented without hindrance. Also the number of circuit elements can be reduced greatly and consumption current can also be reduced.

Figure 13:
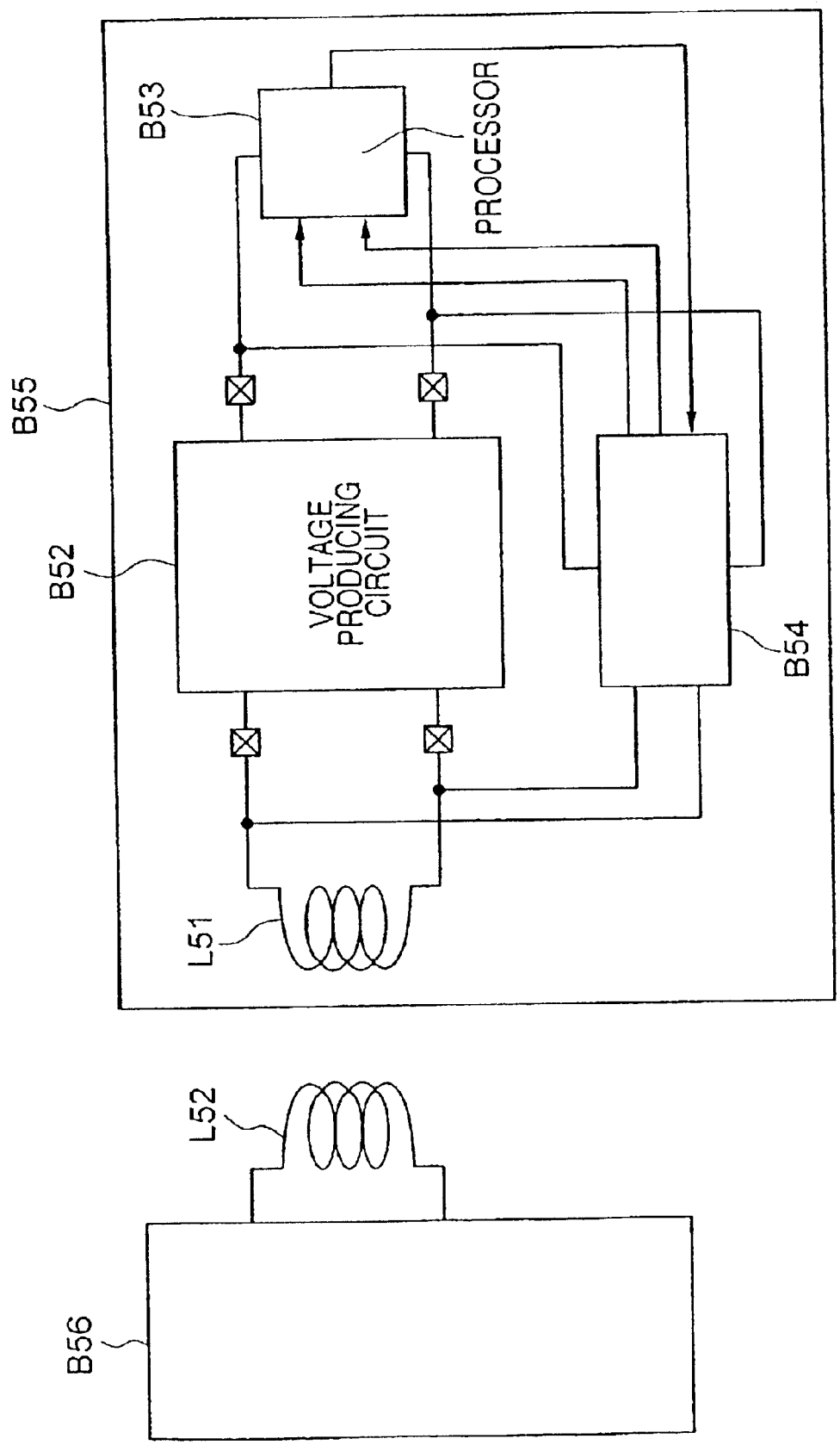
FIG. 13 is a block diagram illustrating a contactless IC card according to an embodiment of the present invention.

FIG. 13 is a block diagram schematically illustrating an embodiment of a contactless IC card according to the present invention. A signal and electric power produced from a reader/writer B56 through an antenna L as an electromagnetic wave are received by an antenna 51 included in an IC card B55. The IC card B55 includes means B52 for producing a voltage from the electric power received by the antenna L51, means B53 for processing the received signal and storing data, and means B54 for detecting the signal received by the antenna L51 and transmitting a signal from the IC card to the reader/writer.

In this embodiment, the power supply circuits 25 shown in FIGS. 1 to 12 are applied to the means B52 for producing the voltage from the electric power received by the antenna L51. The antenna L51 of the embodiment is connected to the input terminals IN1 and IN2 of FIGS. 1 to 12 to produce the input voltage VIN. The output terminal OUT1 of FIGS. 1 to 12 is connected to a power supply terminal of the means B53 and B54, and the output terminal OUT2 of FIGS. 1 to 12 is connected to a ground terminal of the means B53 and B54, so that the circuit operation of the means B53 and B54 can be performed stably.

In the contactless IC card of this embodiment, the power supply circuit shown in FIGS. 1 to 12 can be used to reduce the voltage loss of elements to be controlled so that as much voltage as possible can be supplied to the means B53 and B54 to thereby lengthen a communication distance of the IC card when the amount of electric power received by the antenna L51 is small.

Figure 14:
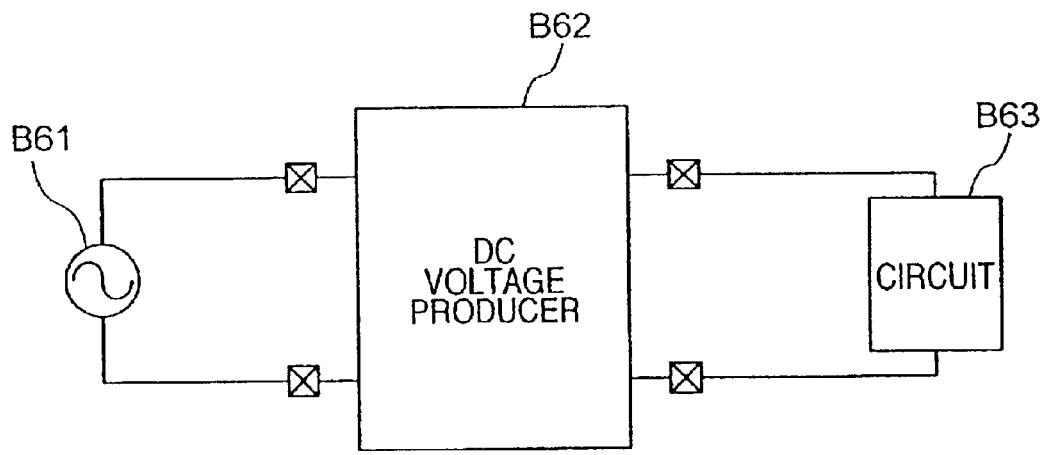
FIG. 14 is a block diagram schematically illustrating a semiconductor integrated circuit device according to an embodiment of the present invention.

FIG. 14 is a block diagram schematically illustrating an embodiment of a semiconductor integrated circuit device according to the present invention. In this embodiment, an input voltage is supplied from an AC power supply B61 such as a commercial power supply. The embodiment includes means B62 for producing a DC power supply voltage from the AC power supply B61 and any circuit means B63 supplied with the DC power supply voltage produced by the means B62 so that the circuit means B62 can be operated. In this embodiment, the power supply circuit shown in FIGS. 1 to 12 is used for the means B62.

The power supply circuit shown in FIGS. 1 to 12 can be used, and the input terminals IN1 and IN2 of FIGS. 1 to 12 are connected to the AC power supply B61.

The output terminals OUT1 and OUT2 of the power supply circuit shown in FIGS. 1 to 12 are connected to a power supply voltage terminal and a ground terminal of the circuit means B63, respectively, so that circuit operation of the circuit means B63 can be effected stably.

Figure 15:
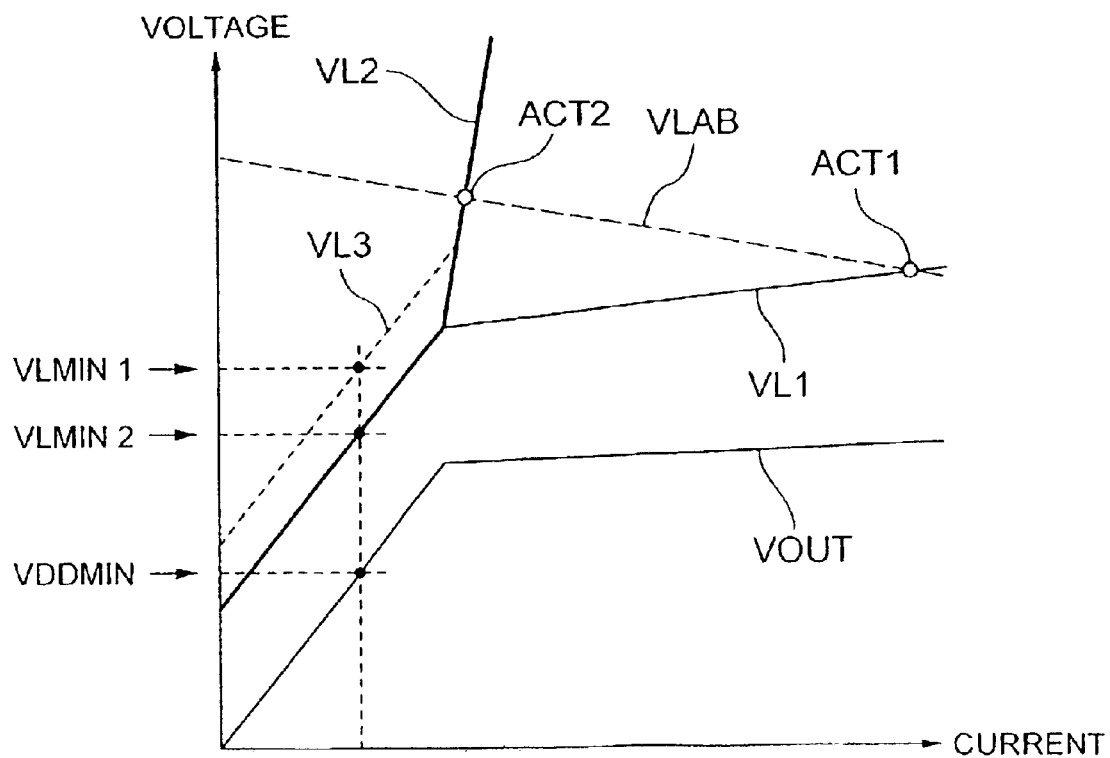
FIG. 15 is graph showing a characteristic of voltage versus current of the power supply circuit for explaining an embodiment of the present invention.

FIG. 15 is a diagram showing a voltage-to-current characteristic of the power supply circuit for explaining an embodiment of the present invention. A characteristic VL3 shows an input voltage required between both ends of an antenna in case of the series regulator shown in FIG. 17. On the contrary, a characteristic VL2 shows an input voltage required between both ends of an antenna in the power supply circuit according to the present invention. The voltage difference between both of the characteristics VL2 and VL3 for the same current corresponds to the voltage drop VF2 across the diode D02 of FIG. 17. When there is such a voltage difference, the voltage across the antenna required to obtain a minimum operation voltage VDDMIN for the inner circuit can be reduced as shown by VLMIN2. That is, the power supply circuit as shown in FIG. 17 requires a larger voltage such as shown by VLMIN1 as the voltage across the antenna required to obtain the minimum operation voltage VDDMIN for the same inner circuit.

Figure 17:
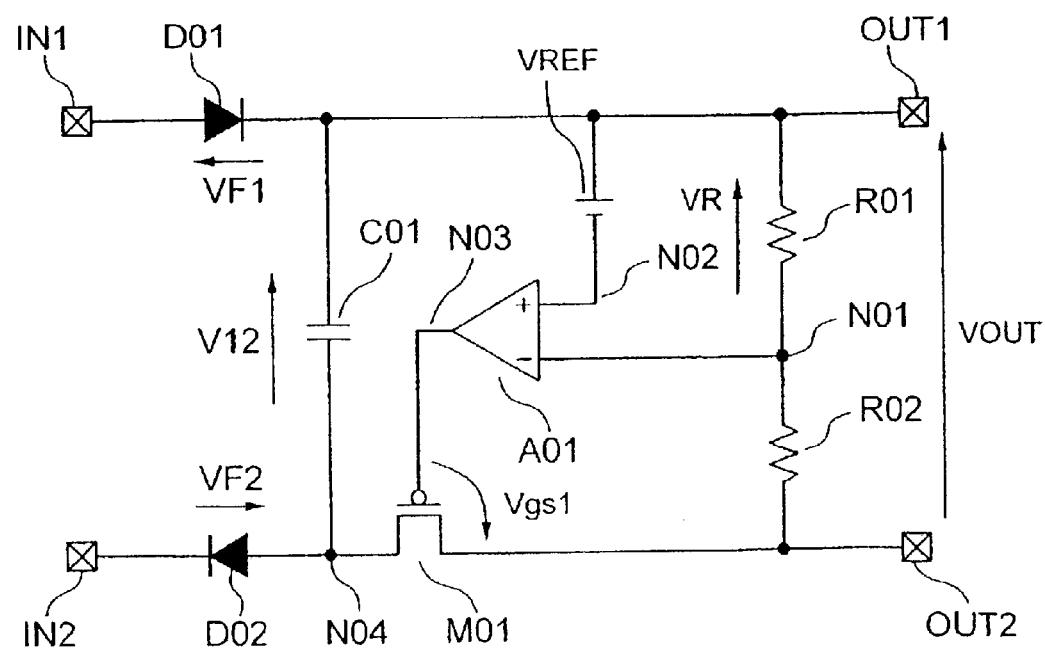
FIG. 17 is a circuit diagram showing an example of a series regulator studied prior to the present invention.

It is also theoretically possible to configure a shunt regulator including a constant voltage element connected across the condenser C01 in the series regulator shown in FIG. 17. However, when electric power is supplied in the contactless manner, that is, in the form of an electromagnetic wave from the reader/writer, as in this embodiment, the voltage characteristic produced across the antenna is as shown by VLAB. Accordingly, an operation point of the shunt regulator is as shown by ACT1, and most of the current flows through the constant voltage element to thereby increase the power consumption to an impractical level. On the contrary, in the present invention and in the series regulator as shown in FIG. 17, the operation point is as shown by ACT2.

Figure 16:
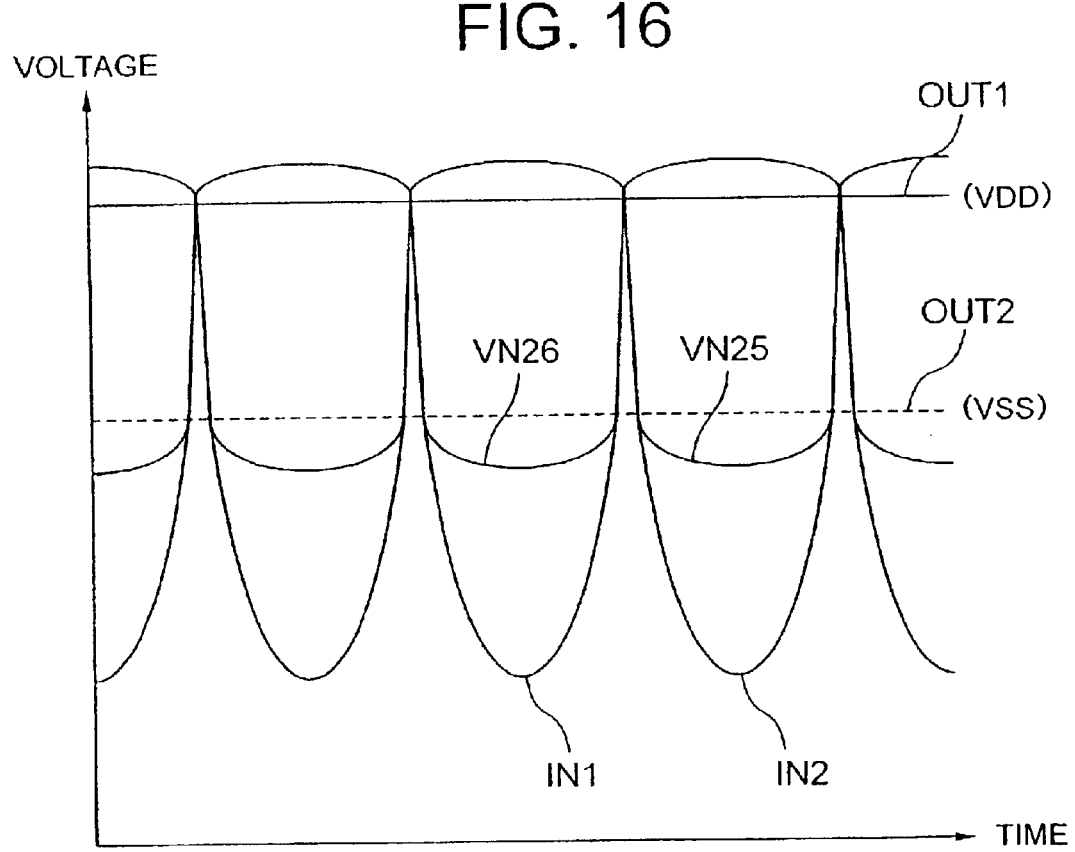
FIG. 16 is a waveform diagram for explaining the operation of the power supply circuit according to an embodiment of the present invention.

FIG. 16 shows a waveform diagram for explaining the operation of the power supply circuit according to the present invention. The waveforms of FIG. 16 correspond to those at portions in the full-wave rectification circuit as shown in FIG. 9. FIG. 16 shows the waveforms on the side of the inner circuit to be loaded. Actually, even when an AC signal such as a sine wave is supplied between the input terminals IN1 and IN2, a voltage difference corresponding to the voltage between the drain and source terminals of the PMOS transistor M26 or M27 is produced between the input terminal IN1 or IN2 and the output terminal OUT1 during a positive half period at the input terminal IN1 or IN2. Accordingly, the waveform on the positive side collapses and the voltage waveform on the negative side is increased relatively. Voltages VN26 and VN25 at junctions N26 and N25 are produced across resistors R24 and R23, respectively, so that the voltage at the output terminal OUT2 is made constant.

More particularly, the currents flowing through the resistors R24 and R23 are adjusted by the PMOS transistor M21 in response to the voltages VIN1 and VIN2 at the input terminals IN1 and IN2 during the negative half period, so that the voltages VN26 and VN25 are produced. A voltage difference between the junction N26 and the terminal OUT2 is the voltage between the gate and source terminals of the PMOS transistor M24 and M22. In FIG. 16, with the margin for the latching-up of the semiconductor integrated circuit forward bias voltage is applied between the source and drain area of the PMOS transistor M26 or M27. Hence, it is useful to create a limitation by means of the voltage between the drain and source terminals of the PMOS transistors M26 and M27, as described above.

The effects obtained by the embodiments are operation device, it is useful to reduce the voltage difference at the input terminal IN1 or IN2 to the output terminal OUT1. More particularly, when the semiconductor substrate is made of an N-type substrate, the voltage (VDD) at the output terminal OUT1 is applied thereto. Accordingly, when the voltage applied to the input terminal IN1 or IN2 is higher than that voltage, a as follows:

(1) An AC voltage is applied to the first and second input terminals, and the rectification transistor having the drain (or collector) connected to the second input terminal and the gate (or base) and the drain (or collector) connected to each other through the resistor supply a rectified current between the first and second input terminals. The first voltage detection means produces the control voltage so that the rectified voltage obtained on the side of the source (or emitter) of the first rectification transistor is equal to the predetermined reference voltage. The first voltage controlled current source can produce the current in accordance with the control voltage and supply the current to the first resistor means to thereby obtain the stable smoothed voltage with high efficiency.

(2) In addition to the above, the first unidirectional element for permitting the current flow corresponding to the rectified current is connected between the first input terminal and the first output terminal for producing the rectified voltage, and the first voltage controlled current source is connected between the first output terminal and the gate (or base) of the first rectification transistor. The source (or emitter) of the first rectification transistor is connected to the second output terminal for producing the rectified voltage. With such a circuit configuration, the rectification operation utilizing the voltage clamp operation of the first unidirectional element on the basis of one voltage on the positive or negative side of the input AC voltage can be attained stably.

(3) In addition to the above, the first rectification transistor is constituted by the first rectification MOSFET, and the voltage detection means is constituted by the operational amplifier circuit supplied with the divided voltage of the rectified voltage and the reference voltage. The first voltage controlled current source is constituted by the first MOSFET having the gate supplied with the control voltage and by the second MOSFET connected between one end of the source-drain path of the first MOSFET and the gate of the first rectification MOSFET and for permitting the current flow in the direction corresponding to the rectification current. With such a circuit configuration, the power supply circuit suitable for the semiconductor integrated circuit device constituted by MOSFETs can be configured.

(4) In addition to the above, the gate and the drain terminals of the second MOSFET are connected to form a diode, so that such an element can be configured simply in the semiconductor integrated circuit.

(5) In addition to the above, the second MOSFET is formed of the same conductivity type as that of the first rectification MOSFET, and the first MOSFET and the gate thereof is connected to the second input terminal, so that the voltage loss in the voltage controlled current source can be reduced even more.

(6) In addition to the above, the third MOSFET having the gate and the drain terminals connected to form a diode is employed as the first unidirectional element, so that the element can be configured simply in the semiconductor integrated circuit.

(7) In addition to the above, the first unidirectional element is constituted by the third MOSFET, which is formed of the same conductivity type as that of the first rectification MOSFET and the first and second MOSFETs, and the gate thereof is connected to the second input terminal, so that the voltage loss can be reduced and the margin for the latching-up operation can be increased.

(8) In addition to the above, the second unidirectional element for supplying the current corresponding to the rectified current between the second input terminal and the first output terminal for producing the rectified voltage, the second rectification transistor having the drain terminal (or collector) connected to the second input terminal, and the gate (or base) and the drain terminals (or collector) connected to each other through the second resistor means and for supplying the rectified current between the first input terminal and the second input terminal, the second voltage controlled current source for producing the current in accordance with the control voltage to supply the current to the second resistor means, and the second voltage detection means for producing the control voltage so that the rectified voltage obtained on the side of the source (or emitter) terminal of the second rectification transistor is equal to the predetermined reference voltage are also provided, so that the full-wave rectification can be made to thereby attain a higher efficiency and stabilization of the output.

(9) In addition to the above, the first and second rectification transistors are constituted by the first and second rectification MOSFETs, and the voltage detection means is constituted by the operational amplifier circuit supplied with the divided voltage of the rectified voltage and the reference voltage. The first and second voltage controlled current sources are constituted by the first and fourth MOSFETs having the gates supplied with the control voltage and by the second and fifth MOSFETs which are connected between one end of the source-drain of each of the first and the fourth MOSFETs and the gate of each of the first and the second rectification MOSFETs and are formed into a diode for flowing the current in the direction corresponding to the rectification current. With such a circuit configuration, the power supply circuit suitable for the semiconductor integrated circuit device constituted by the MOSFETs can be configured.

(10) In addition to the above, the first and second unidirectional elements are constituted by the third and the sixth MOSFETs, respectively, and the third and the sixth MOSFETs are formed of the same conductivity type as that of the MOSFETs. The gate of the third MOSFET is connected to the second input terminal, and the gate of the sixth MOSFET is connected to the first input terminal. With such a circuit configuration, the voltage loss can be reduced and the margin for the latching-up operation can be increased.

(11) In addition to the above, the antenna for producing the AC voltage is externally connected to the first and second input terminals, so that the semiconductor integrated circuit device suitable for the contactless electronic device can be obtained.

(12) In the contactless electronic device including the power supply circuit for producing the internal voltage from electric power received by the antenna for receiving signals and electric power, the inner circuit which is operated by the internal voltage, and the communication circuit operated by the internal voltage and for performing reception and transmission of signals through the antenna, the AC voltage produced by the antenna is applied between the first and the second input terminals of the power supply circuit, and the rectification transistor having the drain (or collector) terminal connected to the second input terminal and the gate (or base) and the drain (or collector) terminals connected to each other through the resistor means supplies the rectified current between the first and second input terminals. The first voltage detection means produces the control voltage so that the rectified voltage obtained on the side of the source (or emitter) terminal of the first rectification transistor is equal to the predetermined reference voltage, and the first voltage controlled current source produces the current in accordance with the control voltage to supply the current to the first resistor means, so that the smoothed voltage can be obtained stably with higher efficiency and the communication distance can be lengthened.

(13) In addition to the above, the first rectification transistor is constituted by the first rectification MOSFET, and the first unidirectional element for flowing the current corresponding to the rectified current is connected between the first input terminal and the first output terminal for producing the rectified voltage. The voltage detection means is constituted by the operational amplifier circuit supplied with the divided voltage of the rectified voltage and the reference voltage and the first voltage controlled current source are constituted by the first MOSFET having the gate terminal supplied with the control voltage and the second MOSFET connected between one end of the source-drain of the first MOSFET and the gate terminal of the first rectification MOSFET and also for flowing the current in the direction corresponding to the rectified current. With such a circuit configuration, the power supply circuit suitable for the inner circuit constituted by the MOSFETs can be configured.

(14) In addition to the above, the second unidirectional element for supplying the current corresponding to the rectified current between the second input terminal and the first output terminal for producing the rectified voltage, the second rectification transistor having the drain (or collector) terminal connected to the second input terminal and the gate (or base) and the drain (or collector) terminals connected to each other through the second resistor means and for supplying the rectified current between the first input terminal and the second input terminal, the second voltage controlled current source for producing the current in accordance with the control voltage to supply the current to the second resistor means, and the second voltage detection means for producing the control voltage so that the rectified voltage obtained on the side of the source terminal (or emitter) of the second rectification transistor is equal to the predetermined reference voltage are further provided, so that the full-wave rectification can be made to thereby attain a higher efficiency and stabilization of the output, and the operation of the contactless electronic device can be stabilized.

(15) In addition to the above, the contactless electronic device is constituted by the antenna, the power supply circuit, the inner circuit and the communication circuit mounted on a thin plastic card, so that an IC card having simple and convenient handling can be obtained.

As described above, the present invention made by the present inventors has been described definitely, although it is needless to say that the present invention is not limited to the above embodiments, and various changes and modifications may be made in the present invention without departing from the spirit and the scope of the invention as hereinafter claimed. For example, the operational amplifier circuit can take various modifications concretely. The power supply circuit, the inner circuit and the communication circuit of the contactless IC card of FIG. 13 may be configured by a plurality of semiconductor integrated circuit devices. The present invention can be widely utilized in semiconductor integrated circuit devices and contactless electronic devices which smooth an AC voltage to produce the internal voltage.

The effects attained by the representative of the inventions disclosed in this application are described briefly as follows: the AC voltage is applied between the first and second input terminals, and the rectification transistor having the drain (or collector) terminal connected to the second input terminal and the gate (or base) and the drain (or collector) terminal connected to each other through the resistor means supply the rectified current between the first and second input terminals. The first voltage detection means produces the control voltage so that the rectification voltage obtained on the side of the source (or emitter) terminal of the first rectification transistor is equal to the predetermined reference voltage, and the first voltage controlled current source produces the current in accordance with the control voltage to supply the current to the first resistor means, so that the smoothed voltage can be produced stably with higher efficiency.

In the contactless electronic device including the power supply circuit for producing the internal voltage from electric power received by the antenna for receiving signals and electric power, the inner circuit which is operated by the internal voltage, and the communication circuit operated by the internal voltage, which is intended for performing reception and transmission of signals through the antenna, the AC voltage produced by the antenna is applied between the first and the second input terminals of the power supply circuit and the rectification transistor having the drain (or collector) terminal connected to the second input terminal and the gate (or base) and the drain (or collector) terminals connected to each other through the resistor means supply the rectified current between the first and second input terminals.

The first voltage detection means produces the control voltage so that the rectified voltage obtained on the side of the source (or emitter) terminal of the first rectification transistor is equal to the predetermined reference voltage, and the first voltage controlled current source produces the current in accordance with the control voltage to supply the current to the first resistor means, so that the smoothed voltage can be obtained stably with higher efficiency and the communication distance can be lengthened.

What is claimed is:

1. A contactless electric device comprising:
   an antenna to receive a signal and electric power;
   a power supply circuit to produce an internal voltage from the electric power received by said antenna; and
   an inner circuit operated by said internal voltage produced by said power supply circuit to process the signal received by said antenna,
   wherein said power supply circuit includes:
   first and second input terminals connected with said antenna;
   first and second output terminals connected with said inner circuit;
   a first rectification transistor having a source-drain path or a collector-emitter path connected between said second input terminal and said second output terminal;
   a first resistor connected between said second input terminal and a gate or a base of said first rectification transistor;
   a second rectification transistor having a source-drain path or a collector-emitter path connected between said first input terminal and said second output terminal;
   a second resistor connected between said first input terminal and a gate or a base of said second rectification transistor;
   a voltage controlled current source to produce a current in accordance with a control voltage to supply said first and second resistors; and
   a voltage detection circuit to produce the control voltage in accordance with a voltage between said first and second output terminals.

2. A contactless electric device according to claim 1, wherein said power supply circuit further includes;
   a third transistor having a source-drain path connected between said first input terminal and said first output terminal, and a gate coupled with said second input terminal; and
   a fourth transistor having a source-drain path connected between said second input terminal and said first output terminal, and a gate coupled with said first input terminal.

3. A contactless electric device according to claim 2, wherein each of said first and second rectification transistors and third and fourth transistors is formed of a MOSFET.

4. A contactless electric device according to claim 1, wherein a voltage detection circuit includes an operational amplifier to compare a reference voltage and the voltage between said first and second output terminals, and to output the control voltage.

5. A contactless electric device according to claim 1, wherein said voltage controlled current source comprises a fifth transistor having a gate to which the control voltage is supplied, a source coupled with said first output terminal, and a drain to supply the current to said first and second resistors.

6. A contactless electric device according to claim 2,
   wherein said voltage controlled current source comprises a fifth transistor having a gate to which the control voltage is supplied, a source coupled with said first output terminal, and a drain to supply the current to said first and second resistor,
   wherein said power supply circuit further includes;
   a first unidirectional element connected between the drain of said sixth transistor and one end of said first resistor; and
   a second unidirectional element connected between the drain of said sixth transistor and one end of said second resistor.

7. A contactless electric device according to claim 6, wherein each of said first and second rectification transistors, said third to sixth transistors, and said first and second unidirectional elements is formed of a MOSFET having the same conductivity type.

8. A contactless electric device according to claim 1, further comprising:
   a thin plastic card in which said antenna and a semiconductor integrated circuit device including said power supply circuit and said inner circuit are sealed.

9. A semiconductor integrated circuit device comprising;
   first and second input terminals applied with an AC voltage;
   first and second output terminals to supply an internal voltage to a circuit;
   a first rectification transistor having a source-drain path or a collector-emitter path connected between said second input terminal and said second output terminal;

a first resistor connected between said second input terminal and a gate or a base of said first rectification transistor;

a second rectification transistor having a source-drain path or a collector-emitter path connected between said first input terminal and said second output terminal;

a second resistor connected between said first input terminal and a gate or a base of said second rectification transistor;

a voltage controlled current source to produce a current in accordance with a control voltage to supply said first and second resistors; and a voltage detection circuit to produce the control voltage in accordance with a voltage between said first and second output terminals.

10. A semiconductor integrated circuit device according to claim 9, wherein said power supply circuit further includes;

a third transistor having a source-drain path connected between said first input terminal and said first output terminal, and a gate coupled with said second input terminal; and a fourth transistor having a source-drain path connected between said second input terminal and said first output terminal, and a gate coupled with said first input terminal.

11. A semiconductor integrated circuit device according to claim 10, wherein each of said first and second rectification transistors and third and fourth transistors is formed of a MOSFET.

12. A semiconductor integrated circuit device according to claim 9, wherein a voltage detection circuit includes an operational amplifier to compare a reference voltage and the voltage between said first and second output terminals, and to output the control voltage.

13. A semiconductor integrated circuit device according to claim 9, wherein said voltage controlled current source comprises a fifth transistor having a gate to which the control voltage is supplied, a source coupled with said first output terminal, and a drain to supply the current to said first and second resistors.

14. A semiconductor integrated circuit device according to claim 10, wherein said voltage controlled current source comprises a fifth transistor having a gate to which the control voltage is supplied, a source coupled with said first output terminal, and a drain to supply the current to said first and second resistor, wherein said power supply circuit further includes;

a first unidirectional element connected between the drain of said sixth transistor and one end of said first resistor; and a second unidirectional element connected between the drain of said sixth transistor and one end of said second resistor.

15. A semiconductor integrated circuit device according to claim 14, wherein each of said first and second rectification transistors, said third to sixth transistors, and said first and second unidirectional elements is formed of a MOSFET having the same conductivity type.

* * * * *